United States Patent
Kohl et al.

(10) Patent No.: US 10,322,617 B2
(45) Date of Patent: Jun. 18, 2019

(54) SYSTEM FOR A MOTOR VEHICLE FOR HEATING AND/OR COOLING A BATTERY AND A MOTOR VEHICLE INTERIOR

(75) Inventors: Michael Kohl, Bietigheim (DE); Karl Lochmahr, Vaihingen/Enz (DE); Thomas Strauss, Notzingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/429,558

(22) Filed: Mar. 26, 2012

(65) Prior Publication Data

US 2012/0241129 A1    Sep. 27, 2012

Related U.S. Application Data

(63) Continuation of application No. PCT/EP2010/064119, filed on Sep. 24, 2010.

(30) Foreign Application Priority Data

Sep. 25, 2009  (DE) .................. 10 2009 042 774

(51) Int. Cl.
*B60H 1/22* (2006.01)
*H01M 10/50* (2006.01)
(Continued)

(52) U.S. Cl.
CPC .......... *B60H 1/00278* (2013.01); *B60L 1/003* (2013.01); *B60L 1/02* (2013.01);
(Continued)

(58) Field of Classification Search
CPC ...... B60H 1/00278; B60H 2001/00928; B60H 2001/00307; B60H 1/22; H01M 10/50
(Continued)

(56) References Cited

U.S. PATENT DOCUMENTS

4,007,315 A * 2/1977 Brinkmann ........ B60H 1/00278
429/62
5,549,153 A * 8/1996 Baruschke ......... B60H 1/00278
165/42
(Continued)

FOREIGN PATENT DOCUMENTS

CN    101331634 A    12/2008
DE    44 08 960 C1    4/1995
(Continued)

OTHER PUBLICATIONS

Chinese Office Action for Chinese Application No. 201080042717.2 dated Mar. 17, 2014 with English translation.

*Primary Examiner* — Frantz F Jules
*Assistant Examiner* — Martha Tadesse
(74) *Attorney, Agent, or Firm* — Muncy, Geissler, Olds & Lowe, P.C.

(57) ABSTRACT

A system for a motor vehicle for heating and/or cooling a battery and a motor vehicle interior is provided that includes a first coolant circuit thermally coupled to the battery, a second coolant circuit for heating the motor vehicle interior having an air heat exchanger for outputting heat from the second coolant circuit to the air of the interior of the motor vehicle, and a heating unit for heating the second coolant circuit. The first coolant circuit and the second coolant circuit are thermally coupled to each other for heating the battery using heat from the second coolant circuit and/or for cooling the air of the motor vehicle interior, in that heat from the second coolant circuit can be fed to the first coolant circuit by the circuit heat exchanger or the mixing valve.

17 Claims, 4 Drawing Sheets

(51) Int. Cl.
*B60H 1/00* (2006.01)
*B60L 1/00* (2006.01)
*B60L 1/02* (2006.01)
*B60L 58/26* (2019.01)
*B60L 58/27* (2019.01)

(52) U.S. Cl.
CPC ............... *B60L 58/26* (2019.02); *B60L 58/27* (2019.02); *B60H 2001/00307* (2013.01); *B60H 2001/00928* (2013.01); *B60L 2240/34* (2013.01); *B60L 2240/545* (2013.01); *Y02T 10/7005* (2013.01); *Y02T 10/705* (2013.01)

(58) Field of Classification Search
USPC ........... 62/79, 259.2, 239, 243, 244; 165/58, 165/104.33, 41; 429/120
See application file for complete search history.

(56) References Cited

U.S. PATENT DOCUMENTS

| | | | | |
|---|---|---|---|---|
| 6,138,466 | A | 10/2000 | Lake et al. | |
| 6,913,067 | B2 * | 7/2005 | Hesse | B60H 1/08 165/202 |
| 7,147,071 | B2 * | 12/2006 | Gering | B60H 1/00278 237/12.3 B |
| 7,451,808 | B2 * | 11/2008 | Busse | B60H 1/00278 165/202 |
| 7,600,391 | B2 * | 10/2009 | Naik | B60H 1/3208 62/238.6 |
| 7,797,954 | B2 * | 9/2010 | Duhme | B60H 1/00278 62/184 |
| 8,753,782 | B2 | 6/2014 | Ishikawa | |
| 2002/0184908 | A1 * | 12/2002 | Brotz | B60H 1/00 62/259.2 |
| 2004/0000161 | A1 * | 1/2004 | Khelifa | B60H 1/00392 62/324.1 |
| 2005/0061497 | A1 | 3/2005 | Amaral et al. | |
| 2007/0157647 | A1 * | 7/2007 | Duhme | B60H 1/00278 62/196.4 |
| 2008/0078542 | A1 * | 4/2008 | Gering | B60H 1/00278 165/202 |
| 2009/0000328 | A1 * | 1/2009 | Scherer | B64D 13/00 62/335 |
| 2010/0307723 | A1 | 12/2010 | Thomas et al. | |
| 2012/0291987 | A1 * | 11/2012 | Himmer | B60H 1/00278 165/42 |

FOREIGN PATENT DOCUMENTS

| | | |
|---|---|---|
| DE | 10 2004 035 879 A1 | 2/2006 |
| DE | 10 2005 048 241 A1 | 4/2007 |
| DE | 10 2008 057 305 A1 | 8/2009 |
| EP | 1 264 715 A2 | 12/2002 |
| EP | 1 637 709 A2 | 3/2006 |
| JP | 2002-354608 A | 12/2002 |
| WO | WO 2008/127527 A1 | 10/2008 |
| WO | WO 2009/062710 A1 | 5/2009 |

\* cited by examiner

SYSTEM FOR A MOTOR VEHICLE FOR HEATING AND/OR COOLING A BATTERY AND A MOTOR VEHICLE INTERIOR

This nonprovisional application is a continuation of International Application No. PCT/EP2010/064119, which was filed on Sep. 24, 2010, and which claims priority to German Patent Application No. DE 10 2009 042 774.0, which was filed in Germany on Sep. 25, 2009, and which are both herein incorporated by reference.

BACKGROUND OF THE INVENTION

Field of the Invention

The invention concerns a system for a motor vehicle for heating and/or cooling a battery and a motor vehicle passenger compartment and a method therefor.

Description of the Background Art

In hybrid vehicles with an internal combustion engine and an electric motor, and also in electric vehicles that are driven by an electric motor alone, an electric heater is generally necessary for heating the air in the vehicle passenger compartment. In hybrid vehicles with an internal combustion engine, the waste heat of the internal combustion engine generally is not sufficient to heat the vehicle passenger compartment. In electric vehicles, no internal combustion engine is present so that heat for heating the air in the vehicle passenger compartment is provided exclusively by the electric heater. In this case, the hybrid vehicles or electric vehicles generally have a second coolant circuit with water as the coolant, which can be heated by the electric heater. The coolant in the second coolant circuit has an air heat exchanger, by means of which the heat from the coolant of the second coolant circuit is transmitted to the air in the vehicle passenger compartment.

The battery of the hybrid vehicle or electric vehicle must be heated or cooled in order to achieve an adequate operating temperature for the battery, for example in a temperature range between 0° C. and 40° C. When electrical energy is drawn from the battery, the battery gives off heat; in consequence, the battery must be cooled so that it does not heat to temperatures of above 30° C. or 40° C. At low outdoor temperatures, for example below 0° C., heating of the battery is necessary so that electrical energy can be drawn from the battery and also so that charging with electrical energy is possible. To this end, the hybrid or electric vehicle has a first coolant circuit with which the battery can be cooled, in particular with ambient air.

EP 1 264 715 A2, which corresponds to U.S. Pat. No. 6,705,101, which is incorporated herein by reference, and which discloses a vehicle cooling system for an electric or hybrid vehicle. The vehicle cooling system has a coolant circuit that is thermally coupled to a battery. Also built into the coolant circuit with the battery is an evaporator of a refrigeration circuit with a condenser, a compressor, and an expansion valve. The coolant circuit with the battery can be cooled by means of the evaporator so that in this way the battery can also be cooled by means of the refrigeration circuit. The refrigeration circuit also has an additional evaporator by means of which the air in a vehicle passenger compartment can be cooled.

SUMMARY OF THE INVENTION

It is therefore an object of the present invention to provide a system for a motor vehicle for heating and/or cooling a battery and a motor vehicle passenger compartment, and a method in which the cooling and heating of the battery can be carried out by means of heat or cold from the second coolant circuit.

This object is attained in an embodiment by a system for a motor vehicle for heating and/or cooling a battery and a motor vehicle passenger compartment comprising a first coolant circuit that is thermally coupled to the battery, in particular to a battery heat exchanger, a second coolant circuit for heating the motor vehicle passenger compartment with an air heat exchanger for transmitting heat from the second coolant circuit to the air in the motor vehicle passenger compartment, and at least one heater for heating the second coolant circuit, wherein the first coolant circuit and the second coolant circuit are coupled to one another thermally, in particular with a circuit heat exchanger or a mixing valve, in order to heat the battery with heat from the second coolant circuit and/or to cool the air of the motor vehicle passenger compartment, in that heat from the second coolant circuit can be conducted to the first coolant circuit, in particular by means of the circuit heat exchanger or the mixing valve.

The first coolant circuit with the battery and the second coolant circuit with the air heat exchanger for heating the air in the vehicle passenger compartment and the heaters are thermally coupled to one another. Thus, in an advantageous manner the battery can be heated by the means that heat is transferred from the second coolant circuit to the first coolant circuit. In this way, heat provided by the heater can be used for heating the battery. Heat that is extracted from the air in the vehicle passenger compartment by means of the air heat exchanger can also be used for heating the battery. In converse fashion, the waste heat from the battery can also be used to heat the air in the vehicle passenger compartment. Because of this thermal coupling of the first and second coolant circuits, the heating and/or cooling of both the battery and the air in the vehicle passenger compartment can thus be optimized overall so that energy can be saved as a result. Moreover, effective heating of the battery is possible without an additional heater being needed that serves solely to heat the battery.

Alternatively, the coupling of the first and second coolant circuits is designed such that a heat transfer from the second coolant circuit to the first coolant circuit is limited.

This means, for example, that the circuit heat exchanger that brings about the coupling of the first and second coolant circuits is designed thermodynamically such that a temperature of 0° to a maximum of 40° is established in the first coolant circuit. Such temperatures are not harmful to the battery. The efficiency of the circuit heat exchanger preferably is between 0.4 and 0.85, especially preferably between 0.5 and 0.75.

In particular, the system comprises a refrigeration circuit with at least an evaporator, a compressor, and a condenser, wherein an evaporator with an evaporator heat exchanger is thermally coupled to the first coolant circuit for indirect cooling of the battery with the evaporator. Consequently, the battery can additionally be cooled by means of the refrigeration circuit using the evaporator that is thermally coupled to the first coolant circuit. It is thus possible to cool the temperature of the battery independently of the outdoor temperature, and thus ensure adequate cooling of the battery even at high outdoor temperatures.

In another embodiment, the first coolant circuit and/or the second coolant circuit has a liquid, for example water, as the coolant.

In an embodiment, the first coolant circuit is thermally coupled to an ambient air heat exchanger for transferring heat from the first coolant circuit to the ambient air and vice versa. By means of the ambient air heat exchanger, heat can be transferred from the first coolant circuit to the ambient air and vice versa. This has numerous advantages. At low outdoor temperatures, if the outdoor temperature of the ambient air is lower than the actual temperature of the battery, the ambient air can be used to cool the battery without energy being needed for operating the refrigeration circuit. In addition, the ambient air can also be used to cool the air of the vehicle passenger compartment if the actual temperature of the air of the vehicle passenger compartment is lower than the temperature of the ambient air. For example, when the sun is shining into the passenger compartment of the motor vehicle and the outdoor temperature of the ambient air is low, cooling of the vehicle passenger compartment is thus possible without the refrigeration circuit being operated, and this is also possible in recirculation mode without outdoor air being introduced directly into the vehicle passenger compartment.

The evaporator heat exchanger can be coupled to or decoupled from the first coolant circuit using a first valve and a first bypass line in the first coolant circuit, and/or the ambient air heat exchanger can be coupled to or decoupled from the first coolant circuit using a second valve and a second bypass line in the first coolant circuit, and/or the circuit heat exchanger can be coupled to or decoupled from the first coolant circuit using a third valve and a third bypass line in the first coolant circuit.

In an embodiment, the at least one heater is an electric heater and/or the at least one heater is a heater heat exchanger for transferring heat from an internal combustion engine to the second coolant circuit.

In useful fashion, the circuit heat exchanger can be coupled to or decoupled from the second coolant circuit using a fourth valve and a fourth bypass line in the second coolant circuit, and/or the air heat exchanger can be coupled to or decoupled from the second coolant circuit using a fifth valve and a fifth bypass line in the second coolant circuit, and/or the heater heat exchanger can be coupled to or decoupled from the second coolant circuit using a sixth valve and a sixth bypass line in the second coolant circuit.

In another embodiment, the first coolant circuit comprises a first circulating pump for pumping the first coolant and/or the second coolant circuit comprises a second circulating pump for pumping the second coolant.

In useful fashion, at least one valve is a 3/2 directional control valve, in particular all valves are 3/2 directional control valves.

Method according to the invention for cooling a battery of a motor vehicle with a first coolant circuit that is thermally coupled to the battery in that heat from the battery is transmitted to the first coolant circuit, and for heating air in a motor vehicle passenger compartment with a second coolant circuit in that heat from the second coolant circuit is transmitted to the air in the motor vehicle passenger compartment, in particular by means of a system described in this patent application, wherein heat from the second coolant circuit is transmitted to the first coolant circuit so that the battery is heated by means of the heat transmitted from the second coolant circuit to the first coolant circuit and/or heat from the first coolant circuit is transmitted to the second coolant circuit so that the air in the motor vehicle passenger compartment is heated by means of the heat transmitted from the first coolant circuit to the second coolant circuit.

In particular, heat from the ambient air is transmitted to the first coolant circuit and vice versa by means of an ambient air heat exchanger.

In another embodiment, the battery is heated in that heat from the ambient air is transmitted to the battery, and/or the battery is cooled in that heat from the battery is transmitted to the ambient air and/or from the battery to the air of the motor vehicle passenger compartment.

In a supplementary variant, heat is removed from the first coolant circuit by means of an evaporator of a refrigeration circuit, and the battery is cooled in this way.

In another variant, the second coolant circuit is heated by the air of the motor vehicle passenger compartment and/or the second coolant circuit is heated by an electric heater and/or the second coolant circuit is heated by the waste heat of an internal combustion engine or of a fuel cell.

In another embodiment, the battery is heated by the heat of the air of the motor vehicle passenger compartment and/or by the heat of the electric heater and/or by the waste heat of an internal combustion engine or of a fuel cell in that the heat from the second coolant circuit is transferred to the first coolant circuit.

In particular, the quantity of coolant circulated per unit time in the first and/or second coolant circuit is controlled and/or regulated in order to control and/or regulate the transfer of heat from the first to the second coolant circuit and vice versa, for example in that the output of the first circulating pump and/or the output of the second circulating pump is controlled and/or regulated and/or a valve is controlled and/or regulated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
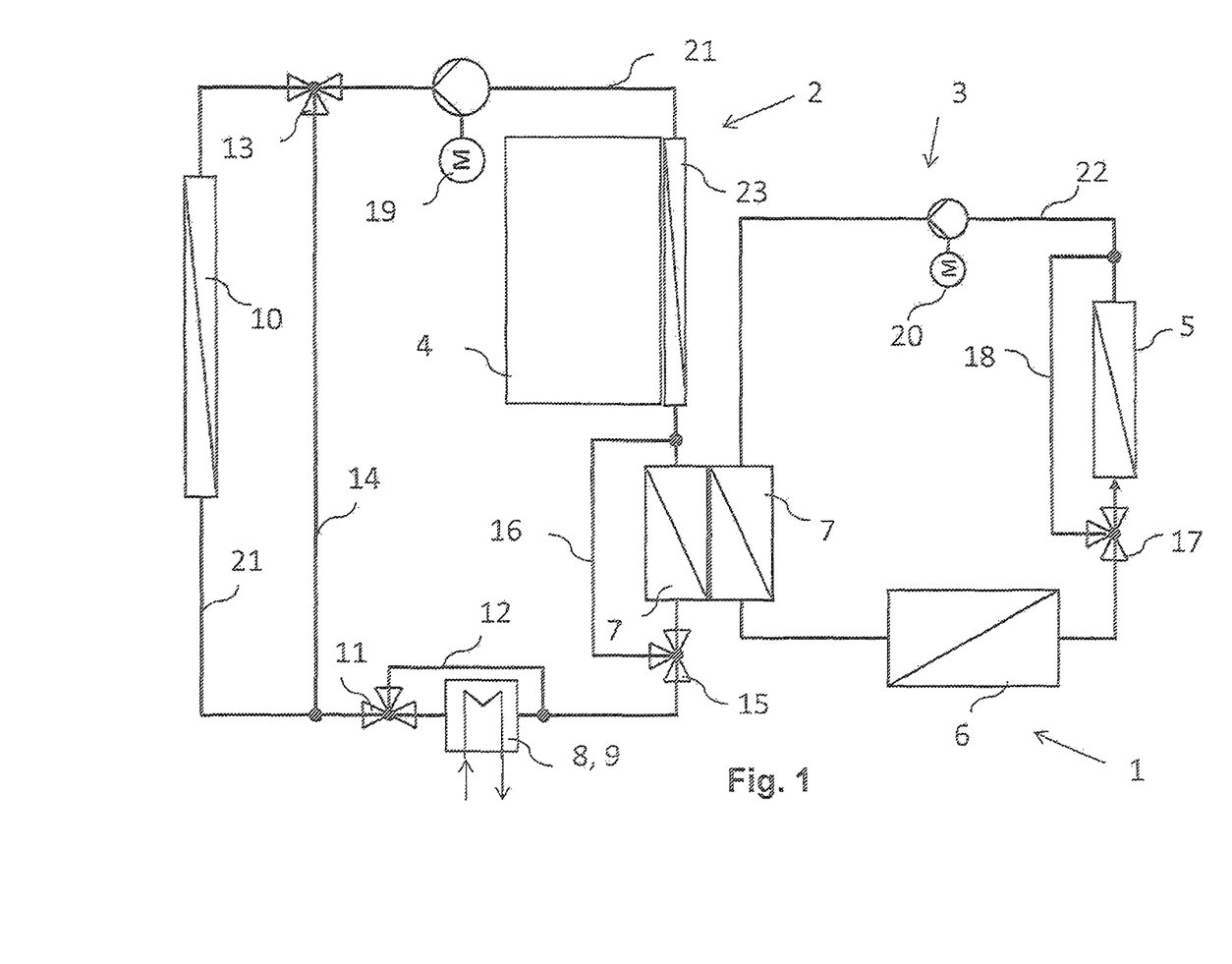
FIG. 1 a highly schematic representation of a system for a motor vehicle for heating and/or cooling a battery and a motor vehicle passenger compartment in a first exemplary embodiment, FIG. 2 a highly schematic representation of the system for a motor vehicle for heating and/or cooling the battery and the motor vehicle passenger compartment in a second exemplary embodiment, FIG. 3 a highly schematic representation of the system for a motor vehicle for heating and/or cooling the battery and the motor vehicle passenger compartment in a third exemplary embodiment, and FIG. 4 a highly schematic representation of the system for a motor vehicle for heating and/or cooling the battery and the motor vehicle passenger compartment in a fourth exemplary embodiment.

FIG. 1 shows a system 1 for a motor vehicle for heating and cooling a battery 4 and a motor vehicle passenger compartment. The battery 4 in this case serves to drive the motor vehicle as a traction battery. The system 1 has a first coolant circuit 2 with lines 21 through which water with an antifreeze is circulated as coolant by means of a first circulating pump 19. A second coolant circuit 3 with lines 22 likewise has water with an antifreeze as coolant or as heat transfer medium and is circulated through the lines 22 by means of a second circulating pump 20. The first coolant circuit 2 is thermally coupled in this case to the battery 4 by a battery heat exchanger 23. To cool or heat the battery 4, air that is heated or cooled at the battery heat exchanger 23 is circulated about the battery 4.

In addition, an ambient air heat exchanger 10 is integrated in the first coolant circuit 2. By means of the ambient air heat exchanger 10, heat from the ambient air around the motor vehicle can be transferred to the first coolant circuit 2, and vice versa. By means of a second valve 13, which is designed as a 3/2 directional control valve 13, and a second bypass line 14, the ambient air heat exchanger 10 can be decoupled from the first coolant circuit 2. Additionally integrated in the first coolant circuit 2 is an evaporator 8 or an evaporator heat exchanger 9. The evaporator 8 or evaporator heat exchanger 9 can also be decoupled from the first coolant circuit 2 by means of a first valve 11 and a first bypass line 12.

An air heat exchanger 5 is integrated in the second coolant circuit 3. By means of the air heat exchanger 5, heat can be transferred from the second coolant circuit 2 to air that is supplied to a motor vehicle passenger compartment, so that the air in the motor vehicle passenger compartment can be heated by this means. The reverse is also possible, so that heat from the air of the motor vehicle passenger compartment can be transferred to the second coolant circuit 3 by means of the air heat exchanger 5. The air heat exchanger 5 can be decoupled from the second coolant circuit 3 by means of a fifth valve 17, which is to say a 3/2 directional control valve 17, and a fifth bypass line 18. A heater 6 is additionally integrated in the second coolant circuit 3. The heater 6 in this case preferably is implemented as an electric heater. In a departure therefrom, a heater heat exchanger (not shown) can also be additionally integrated in the second coolant circuit as the heater 6 so that waste heat from an internal combustion engine of a motor vehicle can be delivered to the second coolant circuit 3 by means of the heater heat exchanger if the motor vehicle is a hybrid vehicle with an internal combustion engine and an electric motor. In an electric vehicle, the heater 6 is solely an electric heater.

The temperature level of the second coolant circuit 3 generally is higher than the temperature level of the first coolant circuit 2. The second coolant circuit 3 serves to heat the air to be supplied to the passenger compartment of a motor vehicle in that the fluid in the second coolant circuit 3 is heated by means of the heater 6 and thus the air to be supplied to the passenger compartment of the motor vehicle can be heated by means of the air heat exchanger 5. The air heat exchanger 5 thus constitutes an air heat exchanger 5 of a motor vehicle climate control system with a housing that is not shown and a fan, which is to say that the air to be supplied to the vehicle passenger compartment is directed past the air heat exchanger 5.

The first coolant circuit 2 serves to heat or cool the battery 4 to a desired target temperature, for example in a range between 0° C. and 40° C. If the temperature of the battery 4 is higher than the temperature of the motor vehicle's ambient air, heat from the battery can be delivered to the ambient air by means of the ambient air heat exchanger 10, thereby cooling the battery 4. The reverse is also possible: if the temperature of the ambient air is higher than the temperature of the battery 4, the battery can be heated by means of heat from the ambient air. The evaporator 8 in the first coolant circuit 2 serves to cool the battery 4. In this design, the evaporator 8 is part of a refrigeration circuit (not shown) with a compressor, a condenser, and a refrigerant circuit. The refrigeration circuit in this case preferably is part of the motor vehicle climate control system that is not shown and also has, in addition to the evaporator 8 shown in FIG. 1, another evaporator (not shown) that serves solely to cool the air to be supplied to the vehicle passenger compartment. If the temperature of the ambient air is higher than the actual temperature of the battery, cooling of the battery by means of the ambient air is not possible. To this end, the coolant of the first coolant circuit 2 is cooled by means of the evaporator 8, and the battery 4 is cooled to the desired temperature in this way. In this case of cooling the battery 4 by means of the evaporator 8, the ambient air heat exchanger 10 generally is decoupled from the first coolant circuit 2 by means of the second valve 13 and the second bypass line 14, so that the cold provided to the first coolant circuit 2 by the evaporator 8 is not given off to the environment and, moreover, the output of the first circulating pump 19 can be reduced in order to thereby save additional energy.

When the battery is being cooled or heated solely by means of the ambient air heat exchanger 10, the evaporator 8 generally is decoupled from the first coolant circuit in order to reduce the flow resistance in the first coolant circuit 2 and thus reduce the output of the first circulating pump to save energy.

The first coolant circuit 2 and the second coolant circuit 3 are thermally coupled to one another by means of a circuit heat exchanger 7. The circuit heat exchanger 7 thus can transfer heat from the second coolant circuit 3 to the first coolant circuit 2 and vice versa. The circuit heat exchanger 7 can be hydraulically decoupled from the first coolant circuit 2 by means of a third valve 15 as a 3/2 directional control valve and a third bypass line 16. In addition, it is possible to control the flow through the circuit heat exchanger 7 and the third bypass line 16 by means of the valve 15 in such a manner that only a part of the amount of coolant that flows through the line 21 to the third valve 15 is directed to the circuit heat exchanger 7. In this way it is possible to control the transfer of heat from the first coolant circuit 2 to the second coolant circuit 3 and vice versa. The more liquid is directed through the circuit heat exchanger 7, which is to say the more coolant from the first coolant circuit 2 flows through the circuit heat exchanger 7, the more heat per unit time can be transferred from the second coolant circuit 3 to the first coolant circuit 2, and vice versa.

On account of the thermal coupling of the second coolant circuit 3 with the first coolant circuit 2, the battery 4 can be heated indirectly by the heater 6. In this way, it is possible in advantageous manner to heat the battery 4 in an energy-optimized manner without using a separate heater for the battery 4. To this end, it is only necessary for the heater 6 as an electric heater to be turned on and for the heat to be transferred to the first coolant circuit 2 by means of the circuit heat exchanger 7. If only the battery is to be heated by means of the heater 6, the air heat exchanger 5 generally is decoupled from the second coolant circuit by means of the fifth valve 17 and the fifth bypass line 18 in order to avoid unnecessary heat loss at the air heat exchanger 5 and reduce the flow resistance in the second coolant circuit 3 in order to require the least possible drive power for the second circulating pump 20. In analogous fashion, in this operating case, at the first coolant circuit 2 the ambient air heat exchanger 10 and the evaporator 8 are also decoupled from the first coolant circuit 2. In this way, heat is not delivered unnecessarily to the ambient air by the ambient air heat exchanger 10, for example. Moreover, it is also possible to heat the air in the vehicle passenger compartment by means of waste heat from the battery 4. For example, if a large amount of electric power is drawn from the battery 4, and thus large amounts of heat are delivered to the first coolant circuit 2 by the battery 4, this waste heat from the battery 4 can be delivered not just to the ambient air heat exchanger 10, but can also be delivered through the circuit heat exchanger 7 to the air heat exchanger 5, which heats the air to be supplied to the vehicle passenger compartment. Furthermore, heat from the ambient air can also be delivered to the air heat exchanger 5, and thus the vehicle passenger compartment, with the ambient air heat exchanger 10. Any desired intermediate settings are also possible in the various operating settings described. For example, the waste heat from the battery 4 can be delivered to both the air heat exchanger 5 and the ambient air heat exchanger 10. This is possible in that the valves 11, 13, 15 and/or 17 are appropriately actuated by a control unit that is not shown.

In addition to the control unit that is not shown, the system 1 also comprises temperature sensors for sensing all important components, in particular the battery 4, the air heat exchanger 5, the ambient air heat exchanger 10, the ambient air, the air in the vehicle passenger compartment, the coolant in the first coolant circuit 2 and/or the coolant in the second coolant circuit 3. In this way it is possible overall to achieve an energy-optimized cooling or heating of the battery 4 as well as the air in the vehicle passenger compartment by means of the control unit. Thus, the energy required for cooling and/or heating the battery 4 can be minimized overall in an advantageous manner.

Figure 2:
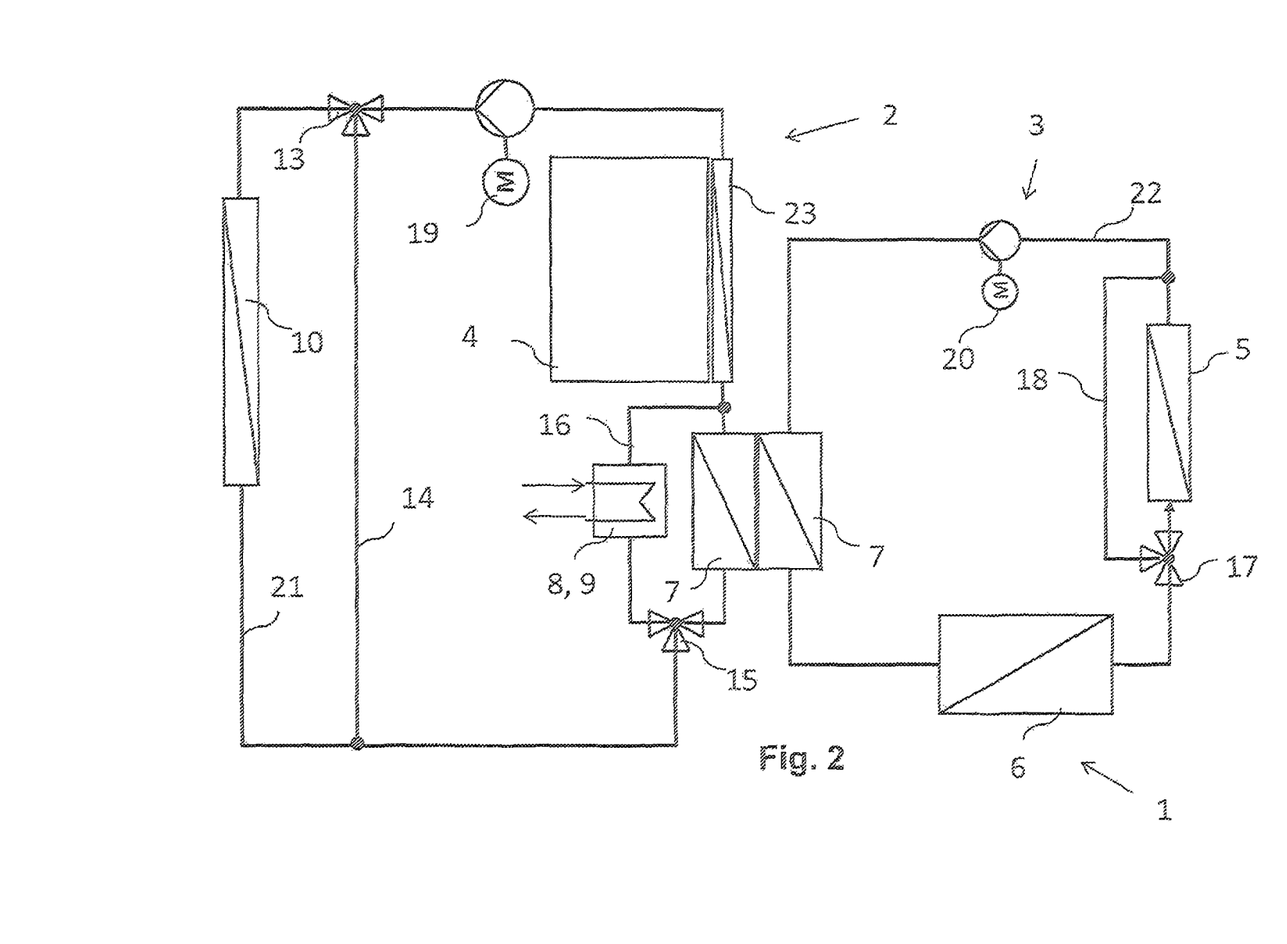

FIG. 2 shows a second exemplary embodiment of the system 1. In the material that follows, essentially only the differences from the first exemplary embodiment from FIG. 1 will be described. The evaporator 8 or the evaporator heat exchanger 9 is integrated in the third bypass line 16, so that the evaporator 8 and the circuit heat exchanger 7 are arranged hydraulically in parallel. By means of the third valve 15 as a 3/2 directional control valve, coolant from the first coolant circuit 2 can flow through only the circuit heat exchanger 7, only the evaporator 8, or in an intermediate setting, both the circuit heat exchanger 7 and the evaporator heat exchanger 9. In this way the first valve 11 and the first bypass line 12 can be left out as compared to the first exemplary embodiment, which is to say that the first valve 11 and the first bypass line 12 can be eliminated and the pressure loss in the first coolant circuit 2 can be reduced.

Figure 3:
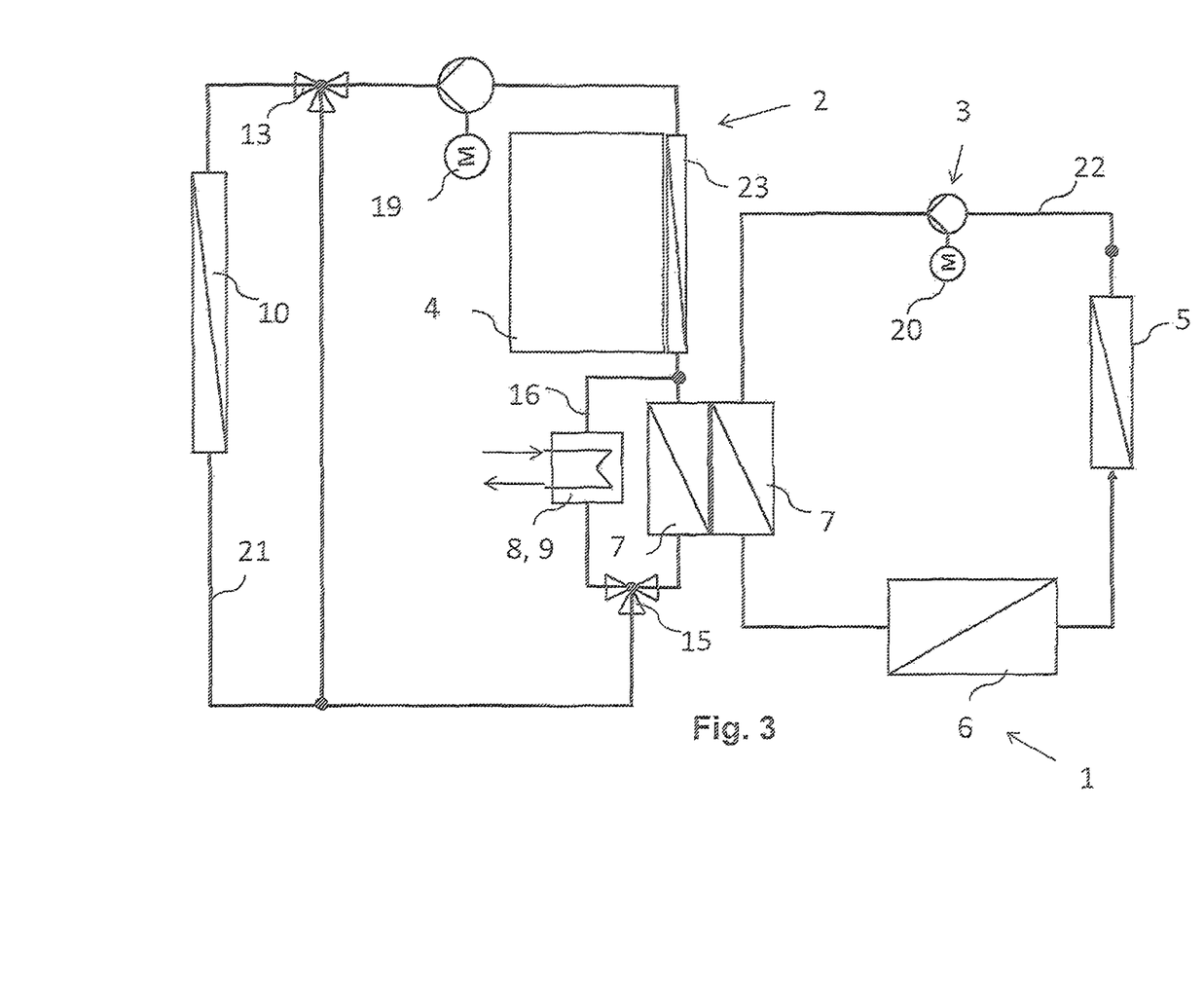

FIG. 3 shows a third exemplary embodiment of the system 1. In the material that follows, essentially only the differences from the second exemplary embodiment from FIG. 2 will be described. In the second coolant circuit 3, the fifth valve 17 and the fifth bypass line 18 for decoupling the air heat exchanger 5 from the second coolant circuit 3 were eliminated. In this way, the costs of the fifth valve 7 and the fifth bypass line 18 can be saved.

Figure 4:
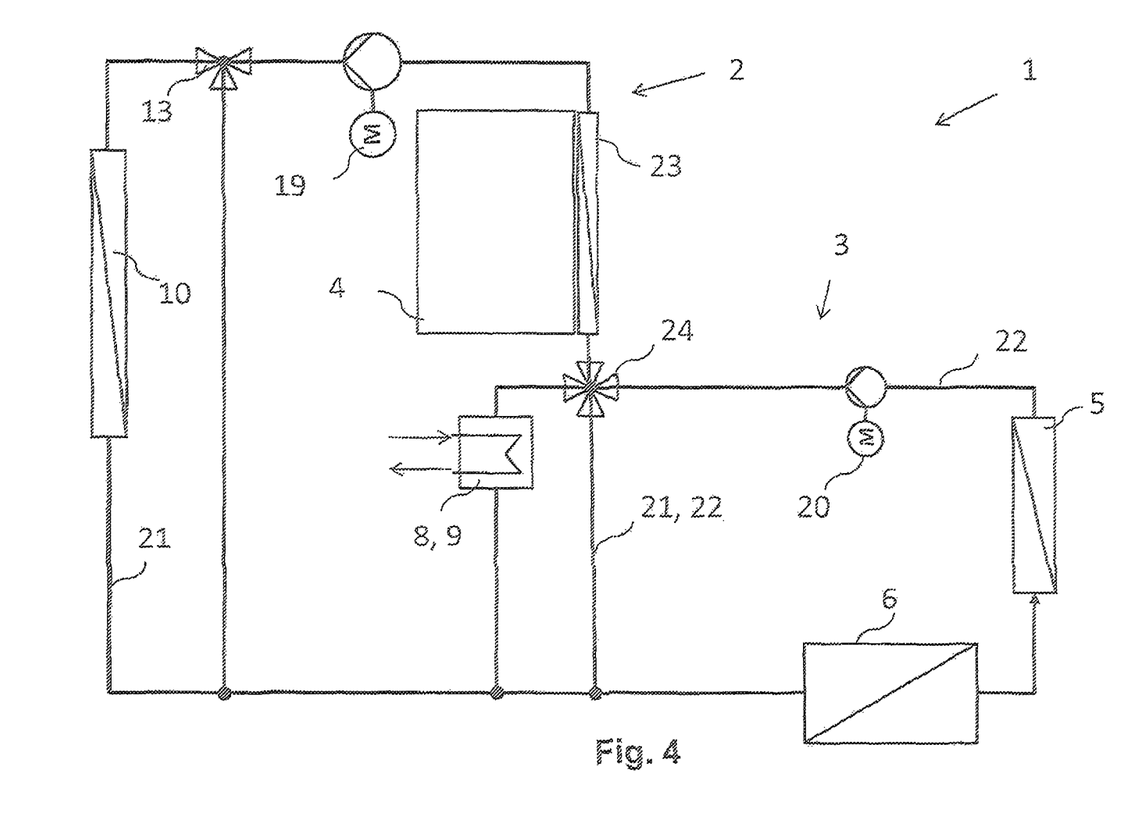

FIG. 4 shows a fourth exemplary embodiment of the system 1. In the material that follows, essentially only the differences from the third exemplary embodiment from FIG. 3 will be described. A mixing valve 24 is used in place of the circuit heat exchanger 7 for thermal coupling of the second coolant circuit 3 to the first coolant circuit 2. Thus, coolant from the first coolant circuit 2 can be introduced into the second coolant circuit 3 and vice versa. The mixing valve 24 is implemented as a 4/3 directional control valve. In this way, the costs of the circuit heat exchanger 7 can be saved. Because of the use of the mixing valve 24, the temperature levels in the first coolant circuit 2 and the second coolant circuit 3 cannot be set independently from one another when both coolant circuits 2, 3 are operated at the same time.

Viewed as a whole, considerable advantages are associated with the system 1 in accordance with the invention and the method in accordance with the invention. The first coolant circuit 2 serves primarily to cool or heat the battery 4, and the second coolant circuit 3 serves primarily to heat the air to be supplied to the vehicle passenger compartment by means of the air heat exchanger 5. Because of the thermal coupling of the two coolant circuits 2, 3, the heat provided by the heater 6 can also be used to heat the battery 4. Moreover, energy-optimized operation is possible overall because all components of the system can be thermally connected to one another in any desired manner, so that the total energy expenditure needed for cooling and/or heating the battery and for cooling or heating the air in the vehicle passenger compartment can be minimized and thereby also optimized.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for a motor vehicle for heating and/or cooling a battery and a motor vehicle passenger compartment, the system comprising:
    a first coolant circuit that is thermally coupled to a battery heat exchanger of the battery, the first coolant circuit comprising a line through which a coolant is passed;
    a second coolant circuit for heating the motor vehicle passenger compartment with an air heat exchanger for transmitting heat from the second coolant circuit to the air in the motor vehicle passenger compartment;
    at least one heater for heating the second coolant circuit; and
    an evaporator, integrated in the first coolant circuit, wherein the evaporator comprises an evaporator heat exchanger thermally coupled to the first coolant circuit for indirect cooling of the battery with the evaporator, said evaporator being positioned downstream from said battery,
    wherein the first coolant circuit and the second coolant circuit are coupled to one another thermally with a circuit heat exchanger in order to heat the battery with heat from the second coolant circuit and/or to cool the air of the motor vehicle passenger compartment in that heat from the second coolant circuit is configured to be conducted to the first coolant circuit via the circuit heat exchanger,
    wherein the first coolant circuit is thermally coupled to an ambient air heat exchanger for transferring heat from the first coolant circuit to ambient air and vice versa,
    wherein the circuit heat exchanger is configured to be decoupled from the first coolant circuit using a first valve and a first bypass line, the first valve positioned along the line of the first coolant circuit,
    wherein the first valve is positioned between the circuit heat exchanger and the evaporator,
    wherein the evaporator heat exchanger is configured to be decoupled from the first coolant circuit using a second valve and a second bypass line in the first coolant circuit, and wherein the battery, including the battery heat exchanger, is connected directly to the circuit heat exchanger with only a portion of the first bypass line disposed therebetween, wherein the evaporator is disposed at a position on the first coolant circuit that is physically separate from a position of the circuit heat exchanger, wherein the evaporator is disposed entirely and only within the first coolant circuit, and wherein the circuit heat exchanger is disposed at a position along the first coolant circuit and the second coolant circuit.

2. The system according to claim 1, wherein the first coolant circuit and/or the second coolant circuit has a liquid as the coolant.

3. The system according to claim 1, wherein the ambient air heat exchanger is configured to be decoupled from the first coolant circuit using a third valve and a third bypass line in the first coolant circuit.

4. The system according to claim 1, wherein the at least one heater is an electric heater and/or the at least one heater is a heater heat exchanger for transferring heat from an internal combustion engine to the second coolant circuit.

5. The system according to claim 1, wherein the first coolant circuit comprises a first circulating pump for pumping the first coolant and/or the second coolant circuit comprises a second circulating pump for pumping the second coolant.

6. A method for cooling a battery of a motor vehicle with a first coolant circuit that is thermally coupled to the battery, the method comprising:

transmitting heat from the battery to the first coolant circuit;

transmitting, for heating air in a motor vehicle passenger compartment with a second coolant circuit, heat from the second coolant circuit to the air in the motor vehicle passenger compartment by a system according to claim 1; and wherein heat from the second coolant circuit is transmitted to the first coolant circuit so that the battery is heated via the heat transmitted from the second coolant circuit to the first coolant circuit and/or heat from the first coolant circuit is transmitted to the second coolant circuit so that the air in the motor vehicle passenger compartment is heated by the heat transmitted from the first coolant circuit to the second coolant circuit.

7. The method according to claim 6, wherein heat from the ambient air is transmitted to the first coolant circuit and vice versa by an ambient air heat exchanger.

8. The method according to claim 6, wherein the battery is heated in that heat from the ambient air is transmitted to the battery, and/or the battery is cooled in that heat from the battery is transmitted to the ambient air and/or from the battery to the air of the motor vehicle passenger compartment.

9. The method according claim 6, wherein heat is removed from the first coolant circuit by the evaporator, and the battery is thus cooled.

10. The method according to claim 6, wherein the second coolant circuit is heated by the air of the motor vehicle passenger compartment and/or the second coolant circuit is heated by an electric heater and/or the second coolant circuit is heated by the waste heat of an internal combustion engine.

11. The method according to claim 10, wherein the battery is heated by the heat of the air of the motor vehicle passenger compartment and/or by the heat of the electric heater and/or by the waste heat of an internal combustion engine in that the heat from the second coolant circuit is transferred to the first coolant circuit.

12. The method according to claim 6, wherein the quantity of coolant circulated per unit time in the first coolant circuit and/or second coolant circuit is controlled and/or regulated in order to control and/or regulate the transfer of heat from the first coolant circuit to the second coolant circuit and vice versa.

13. A system, comprising:

a first coolant circuit;

a battery having a battery heat exchanger, thermally coupled to the first coolant circuit, configured to circulate air around the battery, the first coolant circuit comprising a line through which a coolant is passed;

a second coolant circuit for heating a motor vehicle passenger compartment with an air heat exchanger for transmitting heat from the second coolant circuit to air in the motor vehicle passenger compartment;

at least one heater for heating the second coolant circuit;

a circuit heat exchanger integrated in the second coolant circuit and configured to thermodynamically couple the first coolant circuit to the second coolant circuit;

an evaporator integrated in the first coolant circuit, wherein the evaporator comprises an evaporator heat exchanger thermally coupled to the first coolant circuit for indirect cooling of the battery with the evaporator, said evaporator being positioned downstream from said battery; and a first bypass integrated in the first coolant circuit and a first valve integrated into the first line of the first coolant circuit, the first valve and the first bypass being configured to decouple the circuit heat exchanger from the first coolant circuit, wherein the circuit heat exchanger is configured to be hydraulically decoupled from the first coolant circuit, wherein the evaporator heat exchanger is configured to be decoupled from the first coolant circuit using a second valve and a second bypass line in the first coolant circuit, wherein the first valve is positioned between the circuit heat exchanger and the evaporator, wherein the battery, including the battery heat exchanger, is connected directly to the circuit heat exchanger with only a portion of the first bypass line disposed therebetween, wherein the evaporator is disposed at a position on the first coolant circuit that is physically separate from a position of the circuit heat exchanger, wherein the evaporator is disposed entirely and only within the first coolant circuit, and wherein the circuit heat exchanger is disposed at a position along the first coolant circuit and the second coolant circuit.

14. The system according to claim 13, further comprising an ambient air heat exchanger integrated within the first coolant circuit, the ambient air heat exchanger configured to transfer heat from the first coolant circuit to ambient air and vice versa.

15. The system according to claim 14, further comprising a third valve and a third bypass configured to decouple the ambient air heat exchanger from the first coolant circuit.

16. The system according to claim 13, wherein the circuit heat exchanger is designed to maintain a temperature of 0° F. to 40° F. in the first coolant circuit.

17. The system according to claim 1, wherein the first valve is configured to limit an amount of coolant directed through the line to the circuit heat exchanger.

* * * * *